(12) United States Patent
Koenig et al.

(10) Patent No.: US 7,243,011 B2
(45) Date of Patent: Jul. 10, 2007

(54) HYBRID TRANSMISSION LAUNCH ALGORITHM

(75) Inventors: John J. Koenig, Howell, MI (US);
Sarah C. Drews, Tecumseh, MI (US);
Marci L. McGuire, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/850,767

(22) Filed: May 21, 2004

(65) Prior Publication Data

US 2005/0261817 A1     Nov. 24, 2005

(51) Int. Cl.
*F16H 61/00* (2006.01)
*G06F 19/00* (2006.01)

(52) U.S. Cl. ............... 701/22; 701/54; 903/916; 903/917; 903/927; 903/940; 903/942; 903/945; 903/920; 477/3; 477/45

(58) Field of Classification Search ............. 701/99, 701/101, 84–86, 112, 114, 22, 54; 475/149; 477/3, 15, 107, 102, 174, 45; 903/916–917, 903/927, 940, 942, 945, 920; B60K 17/06, B60K 6/04, 25/04, 41/28
See application file for complete search history.

(56) References Cited

U.S. PATENT DOCUMENTS

| | | | | |
|---|---|---|---|---|
| 5,816,976 | A * | 10/1998 | Kuroiwa et al. | ............. 477/102 |
| 5,993,355 | A * | 11/1999 | Nordg.ang.rd | ............... 477/174 |
| 6,026,921 | A * | 2/2000 | Aoyama et al. | ............ 180/65.2 |
| 6,258,006 | B1 * | 7/2001 | Hanyu et al. | ................... 477/5 |
| 6,258,008 | B1 * | 7/2001 | Tabata et al. | ................ 477/107 |
| 6,272,414 | B1 * | 8/2001 | Takahashi et al. | ............. 701/54 |
| 6,307,277 | B1 * | 10/2001 | Tamai et al. | ............... 290/40 C |

(Continued)

FOREIGN PATENT DOCUMENTS

DE     004225315 A1 *  2/1994

(Continued)

OTHER PUBLICATIONS

Sung Chui Oh, Evaluation of motor characteristics for hybrid electric vehicles using the loop concept, IEEE Transactions on Vehicular Technology, vol. 54 Issue 3, May 2005, pp. 817-824.*

(Continued)

*Primary Examiner*—Cuong Nguyen
(74) *Attorney, Agent, or Firm*—Christopher DeVries

(57) ABSTRACT

A launch system for a hybrid vehicle includes a pump, an electronic throttle, a sensor, and a hybrid control module. The pump is driven by an internal combustion engine and provides pressurized fluid to a transmission. The electronic throttle selectively adjusts airflow to the internal combustion engine and current to an electric motor. The sensor detects when a brake pedal has been released. The hybrid control module increases pressure of the pressurized fluid and limits torque transfer from at least one of the internal combustion engine and the electric motor when the sensor detects that the brake pedal has been released until a predetermined condition has been met. The hybrid control module increases pressure of the pressurized fluid with the pump by increasing the revolutions of the internal combustion engine and limits torque to the transmission by retarding the responsiveness of the electronic throttle.

10 Claims, 4 Drawing Sheets

U.S. PATENT DOCUMENTS

| | | | |
|---|---|---|---|
| 6,345,869 B1 * | 2/2002 | Matsuo et al. | 303/116.1 |
| 6,359,404 B1 * | 3/2002 | Sugiyama et al. | 318/432 |
| 6,379,119 B1 * | 4/2002 | Truninger | 417/22 |
| 6,464,028 B1 * | 10/2002 | Imani | 180/65.2 |
| 6,616,569 B2 * | 9/2003 | Hoang et al. | 477/3 |
| 6,622,805 B2 * | 9/2003 | Nakashima | 180/65.2 |
| 6,736,753 B2 * | 5/2004 | Endo et al. | 477/3 |
| 6,758,185 B2 * | 7/2004 | Surnilla et al. | 123/198 F |
| 6,758,788 B2 * | 7/2004 | Itou | 477/8 |
| 6,769,398 B2 * | 8/2004 | Surnilla et al. | 123/339.19 |
| 6,823,954 B2 * | 11/2004 | Shimabukuro et al. | 180/65.2 |
| 6,825,575 B1 * | 11/2004 | Edelson | 290/40 C |
| 2002/0117338 A1 * | 8/2002 | Itou | 180/54.1 |
| 2002/0117339 A1 * | 8/2002 | Nakashima | 180/65.4 |
| 2002/0173391 A1 * | 11/2002 | Endo et al. | 474/18 |
| 2003/0173123 A1 * | 9/2003 | Nakanowatari | 180/65.2 |
| 2003/0225501 A1 * | 12/2003 | De La Salle et al. | 701/93 |
| 2004/0034460 A1 * | 2/2004 | Folkerts et al. | 701/54 |
| 2004/0045752 A1 * | 3/2004 | Omote et al. | 180/65.2 |
| 2004/0084002 A1 * | 5/2004 | Mitsutani et al. | 123/179.4 |
| 2004/0112653 A1 * | 6/2004 | Boggs et al. | 180/65.2 |
| 2004/0263099 A1 * | 12/2004 | Maslov et al. | 318/254 |
| 2005/0000481 A1 * | 1/2005 | Asakawa et al. | 123/179.16 |
| 2005/0034449 A1 * | 2/2005 | Frieden et al. | 60/284 |
| 2005/0211489 A1 * | 9/2005 | Kowatari et al. | 180/243 |

FOREIGN PATENT DOCUMENTS

| | | | |
|---|---|---|---|
| JP | 8317506 | A2 * | 11/1996 |
| JP | 9084210 | A2 * | 3/1997 |
| JP | 2000197209 | A2 * | 7/2000 |
| JP | 2000184510 | A2 * | 11/2002 |

OTHER PUBLICATIONS

Syed et al., Fuzzy control to improve high-voltage battery power and engine speed of electric vehicle, Annual Meeting of Fuzzy Information Processing Society, 2005, NAFIPS 2005, Jun. 26-28, 2005, pp. 343-348.*

Chen et al., Design and implementation of a high-performance bidirectional DC/AC for advanced EVs/HEVs, IEE Proceedings of Electric Power Applications, vol. 153, Issue 1, Jan. 1, 2006, pp. 140-148.*

P. Joyce, Environmental Specification for automotive electronic components, IEE Seminar on Automotive Electronic Standards: Are They? (Ref. No. 1999/206), Nov. 30, 1999, pp. 2/1-2/8.*

* cited by examiner

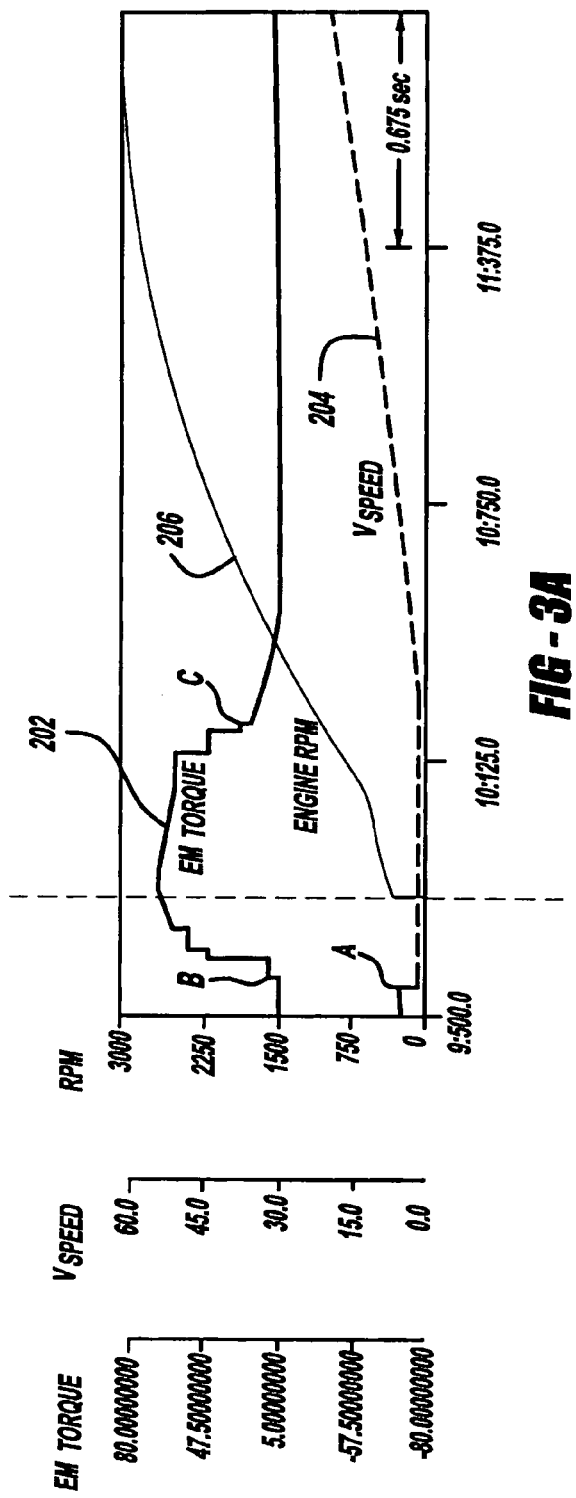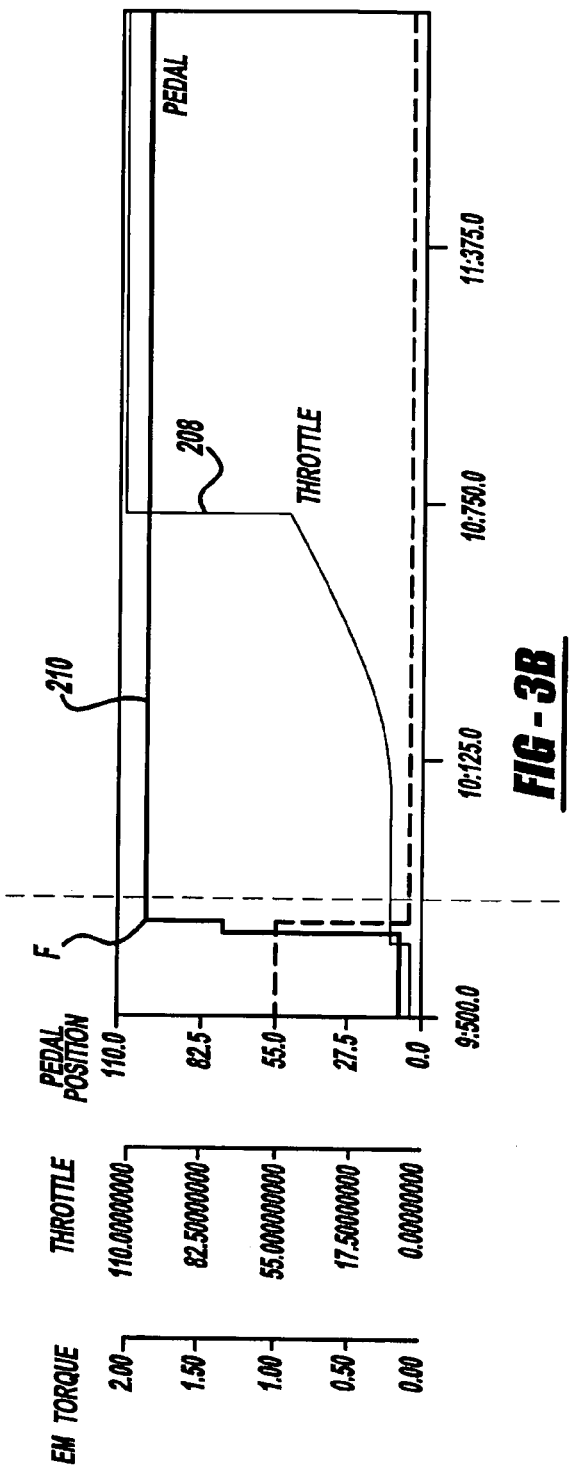

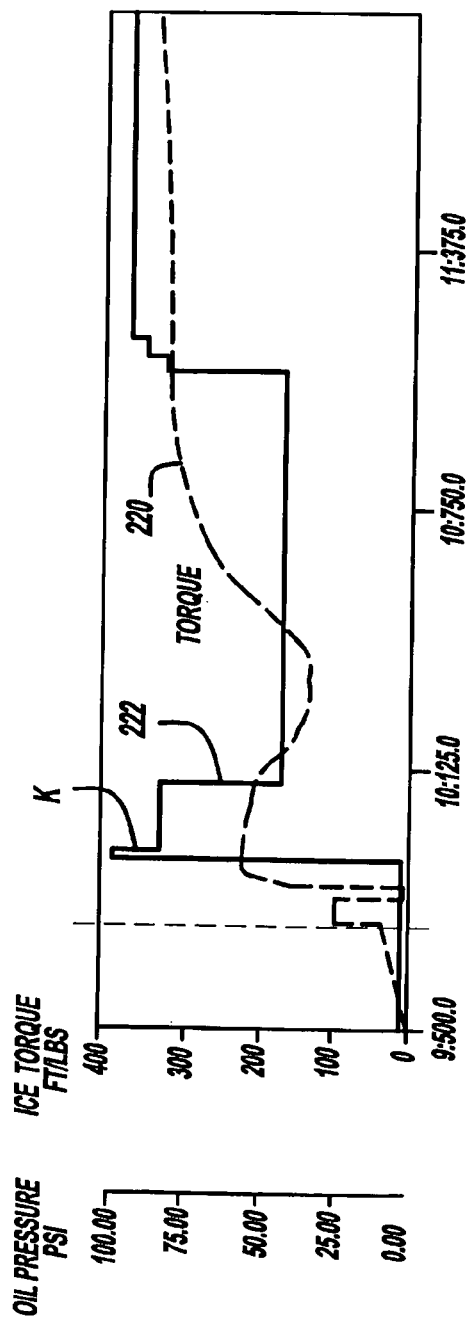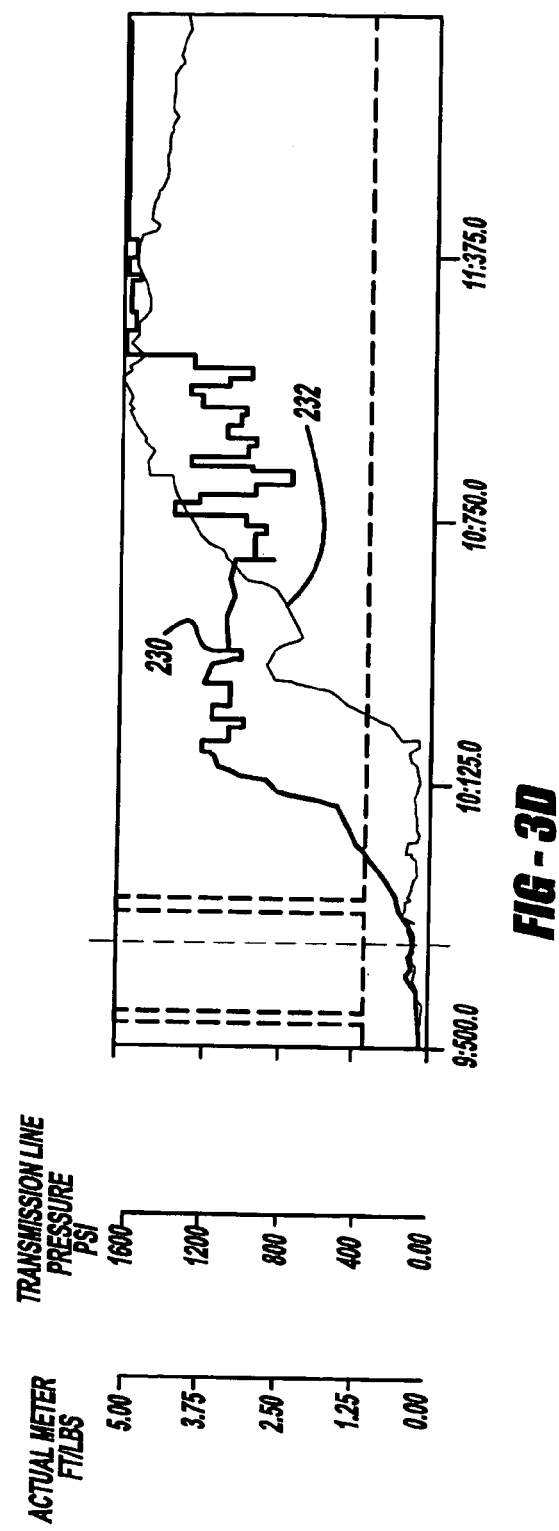

HYBRID TRANSMISSION LAUNCH ALGORITHM

TECHNICAL FIELD

The present invention relates to transmission controls for a hybrid powertrain. More specifically the present invention relates to the utilization of transmission inputs and electronic throttle control to implement a smooth vehicle launch for a hybrid powertrain.

BACKGROUND OF THE INVENTION

The increasing demand to improve fuel economy, eliminate emissions, and reduce noise levels has driven the automotive market to develop a variety of propulsion mechanisms. As an alternative to the internal combustion engine (ICE) the industry has developed a hybrid electric system powered by an electric traction motor(s) and an internal combustion engine. During varying driving conditions, hybrid electric vehicles (HEVs) will alternate between the separate power sources, depending on the most efficient manner of operation of each source.

An HEV may contain either a parallel drivetrain configuration, a series drivetrain configuration or a combination of series and parallel configurations. The configurations allow the ICE to perform relatively more efficiently than its conventional counterpart. In a parallel hybrid vehicle, the electric motor works in parallel with the ICE to combine the power and range advantages of the ICE with the efficiency and the electrical regeneration capability of an electric motor. The ICE drives the wheels through a transmission or transaxle. In a series hybrid vehicle, the ICE drives a generator to produce electricity for the electric motor, which drives the transmission or transaxle. This allows the electric motor to assume some of the power responsibilities of the ICE, thereby permitting the use of a smaller and more efficient engine.

Generally, a conventional automatic transmission, clutch-to clutch auto transmission and/or manual transmission is coupled to the internal combustion engine. The transmission is the mechanical component of a vehicle that transfers power (torque) from the engine to the wheels. The automatic transmission accomplishes this task by providing a number of forward gear ratios that automatically change as a function of vehicle speed and/or throttle position. The variety of gear ranges provided is made possible through the interaction of numerous mechanically, hydraulically and electronically controlled components inside the transmission.

The fuel economy benefits of certain HEV configurations are derived from the vehicle's ability to quickly and smoothly stop and restart the engine, as well as regenerative braking. A parallel hybrid vehicle will turn off the ICE during a normal engine idle period such as static or stopped condition. When the brake pedal is released, the engine will restart.

In order to achieve a smooth vehicle launch during the "engine-off" idle, adequate transmission oil line pressure must be maintained to prime the transmission and eliminate jerk upon a vehicle launch. This line pressure provides system cooling, torque transfer, and is the primary control medium of an automatic transmission. Normally, in a non-hybrid vehicle, the engine will spin the transmission oil pump, which will provide adequate line pressure. In many hybrid applications, a separate auxiliary electric pump is often added to maintain the line pressure when the engine is off. This auxiliary pump adds complexity and cost to the hybrid powertrain system.

SUMMARY OF THE INVENTION

The present invention includes a method to match the transmission line pressure to the torque delivered in a hybrid electric vehicle utilizing conventional transmission and engine components, sensors, and calibrations to generate a smooth launch for a HEV.

In the preferred embodiment, the system may include a vehicle having either a series and/or parallel hybrid drive systems incorporating an ICE, an electronic throttle, electric motor, battery pack, hybrid control module (HCM) and an automatic transmission. The hybrid drive system of the present invention will utilize the ICE and electric motor to propel or motor the vehicle during vehicle conditions that are most efficient for the ICE or electric motor operation. The automatic transmission will be used to transfer the engine torque to the wheels. The HCM is the functional component of the powertrain controls subsystem that controls subsystem functionality including, but not limited to, idle engine off, auto start, electric machine operation, battery state of charge (SOC), electric power takeoff, diagnostics and other vehicle/platform functions. The HCM operation is controlled by software and tailored by calibrations as it monitors and responds to the various inputs.

In the preferred method of the present invention, the algorithm contained in the PCM will match gearbox torque to forward clutch capacity by increasing the normal idle engine idle revolutions per minute (RPM) to increase transmission pump capacity. The throttle is also controlled using the throttle position slew rate (% throttle opening per engine revolution). The strategy may be based on a single timer which begins to increment when the engine request to restart is received. The management of line pressure will continue to run until the timer exceeds a selectable limit.

The transmission line pressure is controlled in a manner that allows a short, selectable burst of pressure at the maximum level followed by a sharp reduction and steady ramp upwards to the steady state level. The ramp rate may be selected as a function of throttle angle. The ramp will finish when the pressure is equal to or exceeds the normal pressure for the current powertrain conditions.

In order to improve the response of the system it is desirable to have the line pressure build up as quickly as possible within the transmission following a restart. This will be achieved by raising the idle engine speed set point for a selectable length of time after restart. The new idle speed may be determined via a calibration constant with the ability to adjust the base airflow for this speed.

Following an engine restart it is desirable to restrict the amount of torque passing through the transmission until the line pressure has built up to the suitable level. This ensures that the clutches will not be damaged by excessive amounts of slip. In order to ensure that large shocks are not detected once the restrictions are lifted (i.e. a large step change in throttle angle) the difference between requested and actual throttle positions is bridged smoothly. Spark retard or advance may also be used to control torque output of the ICE.

The increasing throttle slew limit may be set to zero for a selectable period. Following this period, the slew rate will be set to another selected rate until the throttle reaches its desired value or is released. (The decreasing throttle uses standard slew rates.) Once released the standard increasing throttle slew rate will be invoked.

A failsafe mechanism may be included in the present invention such that the throttle will not be restricted for more than a given length of time and such that the idle speed is reduced shortly after a restart (to ensure predictable creep torque). A timeout will also be provided for the transmission pressure since high pressure all the time will result in poor shift quality and driver dissatisfaction.

BRIEF DESCRIPTION OF THE DRAWINGS

FIGS. 3A–3D are a series of drawings illustrating the operation of the present invention.

DETAILED DESCRIPTION

Figure 1:
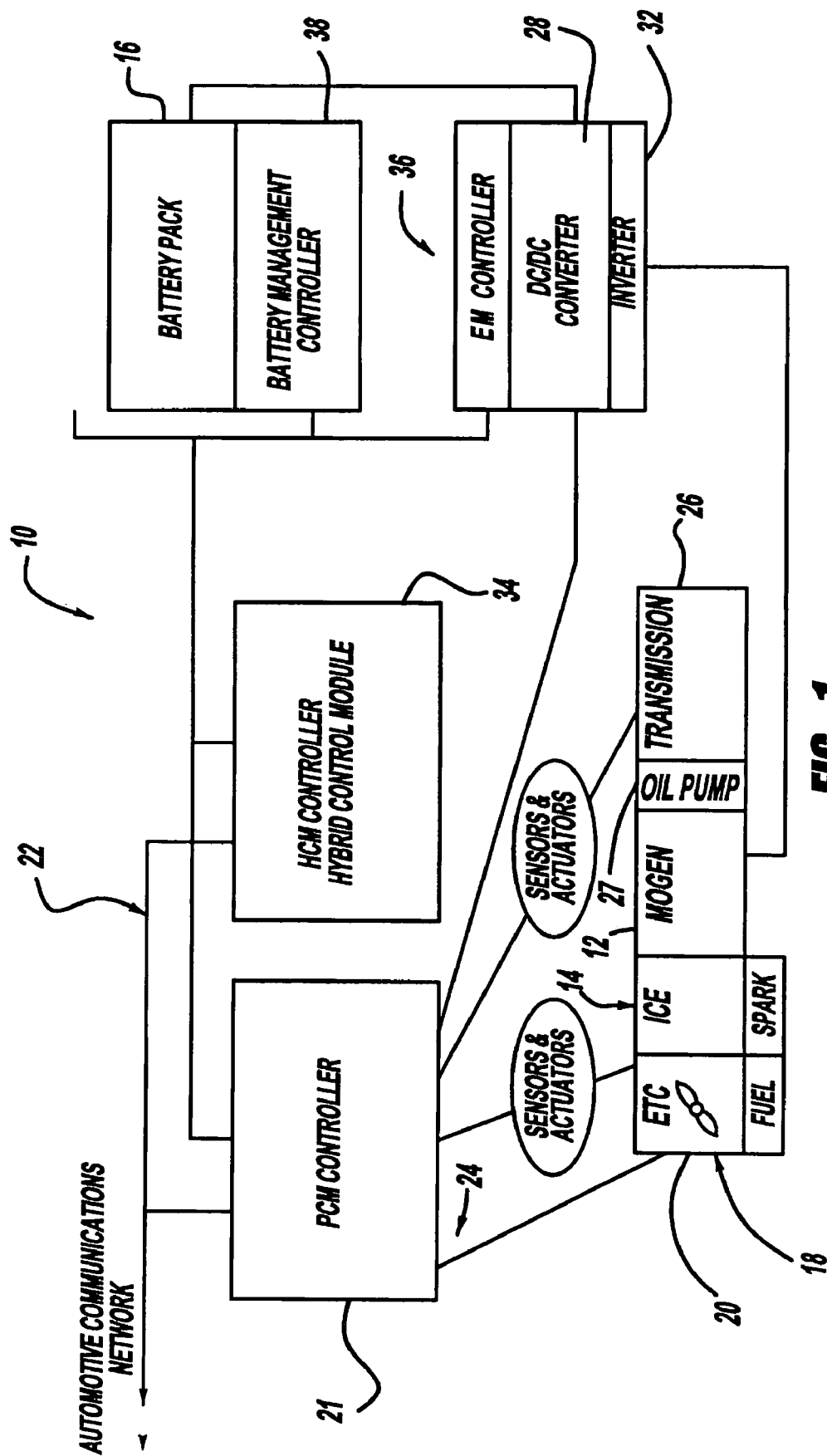
FIG. 1 is a diagrammatic drawing of the hybrid vehicle system of the present invention.

FIG. 1 is a diagrammatic drawing of a hybrid vehicle system of the present invention 10. An electrical machine or motor generator (MoGen) 12 is dynamically coupled to an internal combustion engine (ICE) 14 and functions as either a motor to propel the vehicle or a generator to charge a battery pack 16, depending on the operating state of the vehicle (i.e. braking, stopped, or operating at a constant speed on a highway). The MoGen 12 is preferably an AC induction machine but may comprise any known electrical motor/generator technology, including, but not limited to, DC machines, internal permanent magnet motors, brushless motors, synchronous machines, and switched reluctance machines.

The ICE 14 includes an electronic throttle 18 having a throttle plate controlled by an electronic throttle controller (ETC) 20. The ETC 20 controls the amount of air entering the intake manifold of the ICE 14 and concomitantly the torque output of the ICE 14. The electronic throttle 18 may include any known electric motor or actuation technology in the art including, but not limited to, DC motors, AC motors, permanent magnet brushless motors, and reluctance motors to rotate a throttle plate.

The ETC 20 includes power circuitry to modulate the motor connected to the electronic throttle 18 and circuitry to receive position and speed information from the electronic throttle 18. In the preferred embodiment of the present invention, an absolute rotary encoder is coupled to the electronic throttle 18 to provide speed and position information. In alternate embodiment of the present invention, a potentiometer may be used. The ETC 20 further includes communication circuitry such as a serial link or automotive communication network interface to communicate with a powertrain control module (PCM) 21 over an automotive communications network 22 or serial link 24. In alternate embodiments of the present invention, the ETC 20 may be fully integrated to the PCM 21 to eliminate the need for a physically separate ETC.

A transmission 26 having an oil pump 27 is be dynamically coupled to the ICE 14 or the MoGen 12 and includes known gear sets, clutches, brakes operative to provide a number of drive speed ratios between the engine and a vehicle drive system, as known in the art. The drive wheels may be front or rear drive wheels and the drive system can be modified to include various forms of power transfer to and from either front or rear drive wheels or both as desired.

A suitable DC/DC converter 28 may be provided to direct higher voltage charging power from the MoGen 12 to a low voltage accessory system during generator operation and provide higher voltage electrical power from the battery pack 16 to an inverter 32 driving the MoGen 12. In alternate embodiments of the present invention, the MoGen 12 may be provided power directly from the battery pack 16. The battery pack 16 is preferably comprised of three 12V batteries but may include batteries of any voltage range in series and parallel arrangements. The battery types used in the present invention include, but are not limited to, lead-acid, nickel metal hydride, lithium ion, lithium polymer, or any other similar battery technology.

The MoGen 12, ICE, 14 and transmission 26 may be controlled by a single hybrid system controller 34 or any combination of separate controllers such as the (PCM) 21, electric motor controller (EM) 236, and/or a battery management controller 338. The various controller functions of the controllers, in alternate embodiments of the present invention, may be integrated into a fewer or larger number of controllers. The controllers may comprise any type of control module or vehicle controller known in the art that are equipped with nonvolatile memory, random access memory, discrete and/or analog input/output, a central processing unit and/or communications interfaces for networking within an automotive communications network.

Figure 2:
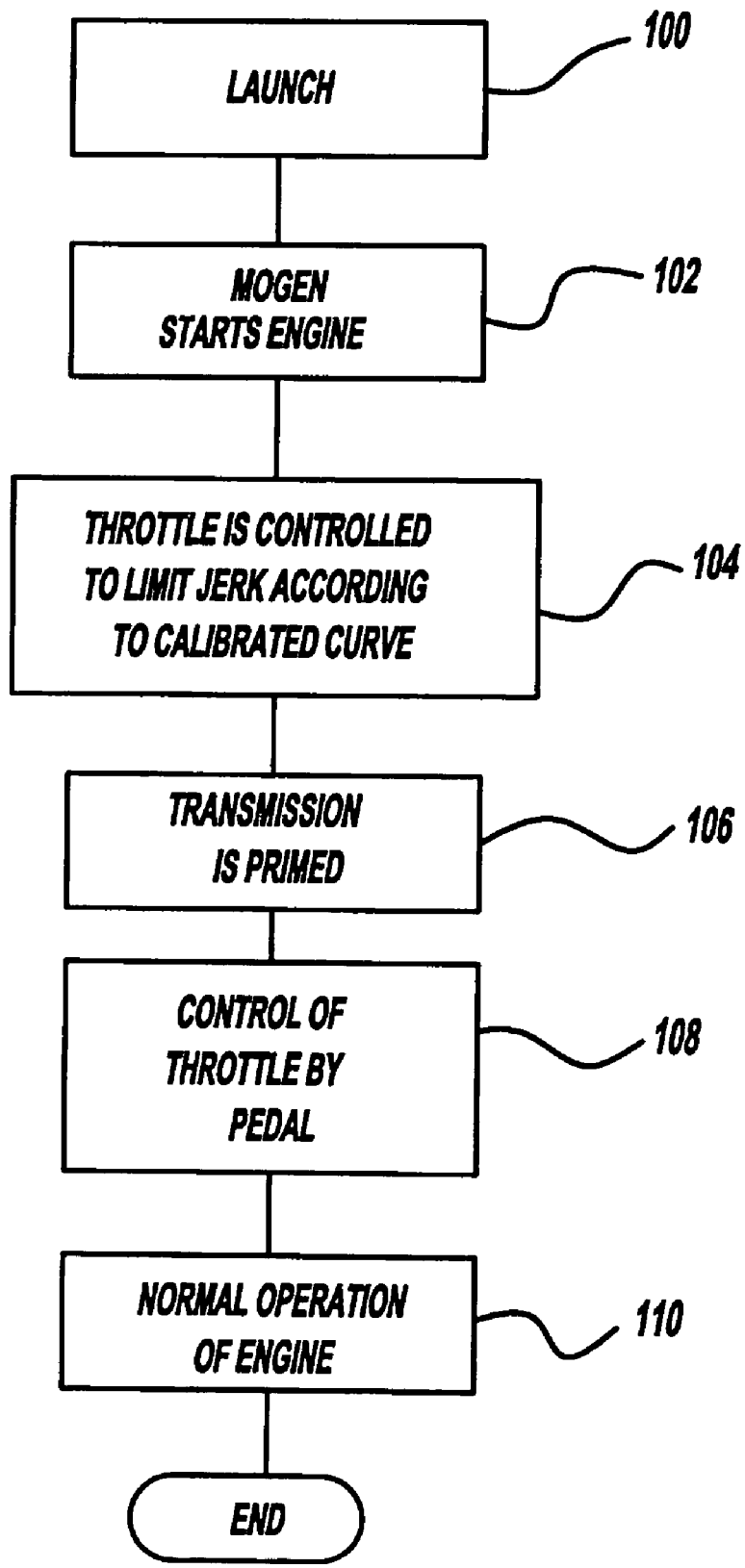
FIG. 2 is a flowchart illustrating the preferred method of the present invention.

FIG. 2 illustrates the methods executed by the HCM 34 to maintain adequate line pressure after an ICE 14 restart by the MoGen 12. Upon vehicle launch in block 100 and after an engine restart at block 102, the pressure in the transmission 18 is controlled in a manner that allows for a short selectable burst of pressure from the oil pump 27 in the transmission 26 at the maximum level followed by a sharp reduction and steady ramp upwards to the steady state level. At block 104, the electronic throttle 18 is used to control the torque output of the ICE 14, which in turn controls the transmission oil pump 27 RPM/output. The difference between the driver requested and actual throttle 18 position is modified to restrict the amount of torque passing through the transmission 26 the line pressure has built up to a suitable level. In alternate embodiments of the present invention, spark retard and advance may be used to control ICE 14 torque.

At block 104, the modified throttle control limit will be set to zero for a selectable period following the engine restart. Following this selectable period, the throttle opening rate will be set to another rate until the electronic throttle 18 reaches its desired value or is released. The throttle rate is stored in a calibration table in the PCM 21 or HCM 3. The ramp in throttle position will finish when the pressure is equal to or exceeds the normal pressure for the current powertrain conditions at where the transmission is then properly primed at block 106. Normal control of the electronic throttle 18 by an accelerator pedal will then be resumed at block 108 and normal operation of the ICE 14 will resume at block 110. In alternate embodiments of the present invention, a modified idle speed will be raised to a set point for a selectable amount of time after the restart. This will allow for the necessary burst of line pressure following the restart. The idle speed will be then reduced shortly after the restart to ensure predictable creep torque.

FIGS. 3A–3D are a series of drawings illustrating a preferred operation of the present invention. FIG. 3A includes a plot 202 for the MoGen 12 torque output which is scaled from −80% to 80% of the torque output of the MoGen 12. A negative torque indicates a power generating state for the MoGen 12 and a positive torque indicates a motoring state for the MoGen 12. A plot 204 illustrates the vehicle speed from 0–60 miles per hour. A plot 206 illustrates the ICE 14 RPM's from 0–3000 RPM's. As can be seen in FIG. 3A, the ICE 12 may be stopped at point A of the Engine RPM plot 206 where the vehicle speed is zero. After vehicle launch at substantially point B on plot 202, the MoGen 12 will output a positive torque in motoring mode and restart the ICE 14. The ICE 14 RPM's and vehicle speed will increase until the positive torque of the MoGen is phased out at substantially the region of point C in plot 202.

FIG. 3B includes plots for throttle position 208 measured 0–110% of position with a 0% position indicating a closed throttle and 100% indicating a wide open throttle, and accelerator pedal position 210 measured 0–110% of position with 0% indicating a substantially zero torque request position and 100% indicating the maximum torque request. As can bee seen in FIG. 3B, at substantially point F the driver makes a maximum torque request by maximizing the accelerator pedal position. The electronic throttle 18 is not allowed to move to a 100% of position, but is slowly ramped to allow the priming of the transmission pump 27 and forward clutch. The electronic throttle 18 ramping may be controlled by a mathematical function in the PCM 21 or it may be stored in a table in the PCM 21. The ramping of the electronic throttle 18 position substantially eliminates launch jerk that may be caused by the ICE 14 when the transmission 26 is not properly primed by controlling the torque output of the ICE 14 until the transmission is properly primed.

FIG. 3C includes plots for ICE torque 220 measured 0–400 ftlbs, transmission oil line pressure 222 measured 0–100 PSI. At substantially point K in plot 220, the line pressure is raised to 75–100 PSI to prime the transmission 27. The ICE 14 torque is then slowly ramped as shown by plot 220 until normal operation of the ICE 14 and transmission 26 can be resumed.

FIG. 3D includes plots for actual measured torque as provided by a propshaft torquemeter, transmission line pressure measured by a pressure transducer. Plot 230 indicates the torquemeter measurement and plot 232 indicates the transmission line pressure. As can be seen from plots 230 and 232 line pressure lags the measured torque of the ICE 14.

It is to be understood that the invention is not limited to the exact construction illustrated and described above, but that various changes and modifications may be made without departing from the spirit and scope of the invention as defined in the following claims.

The invention claimed is:

1. A launch system for a hybrid vehicle, comprising:
   a pump that is driven by an internal combustion engine and that provides pressurized fluid to a transmission;
   an electronic throttle that selectively adjusts airflow to said internal combustion engine;
   an electric motor that drives the internal combustion engine during a vehicle launch;
   a sensor that detects when a brake pedal has been released; and
   a hybrid control module that controls said electronic throttle to increase pressure of said pressurized fluid and to inhibit torque transfer to said transmission when said sensor detects that said brake pedal has been released until one of a predetermined pressure and time condition has been met.

2. The launch system of claim 1 wherein said hybrid control module increases pressure of said pressurized fluid with said pump by increasing idle speed of said internal combustion engine.

3. The launch system of claim 2 wherein said hybrid control module limits torque to said transmission by retarding responsiveness of said electronic throttle.

4. The launch system of claim 3 wherein said predetermined time condition is met when a predetermined time period has expired.

5. The launch system of claim 3 wherein said predetermined pressure condition is met when a pressure of said pressurized fluid reaches a predetermined pressure.

6. A method for launching a hybrid vehicle, comprising:
   providing a pump that is driven by an internal combustion engine and that provides pressurized fluid to a transmission;
   selectively adjusting airflow to said internal combustion engine;
   driving said internal combustion engine using an electric motor during a vehicle launch;
   detecting when a brake pedal has been released; and
   increasing pressure of said pressurized fluid and inhibiting torque transfer to said transmission when said brake pedal has been released until one of a predetermined pressure and time condition has been met.

7. The method of claim 6 further comprising increasing pressure of said pressurized fluid with said pump by increasing idle speed of said internal combustion engine.

8. The method of claim 7 further comprising limiting torque to said transmission by retarding airflow to said internal combustion engine and retarding current to said electric motor.

9. The method of claim 8 wherein said predetermined time condition has been met when a predetermined time period has expired.

10. The method of claim 8 wherein said predetermined pressure condition has been met when a pressure of said pressurized fluid reaches a predetermined pressure.

* * * * *